Patented Feb. 16, 1926.

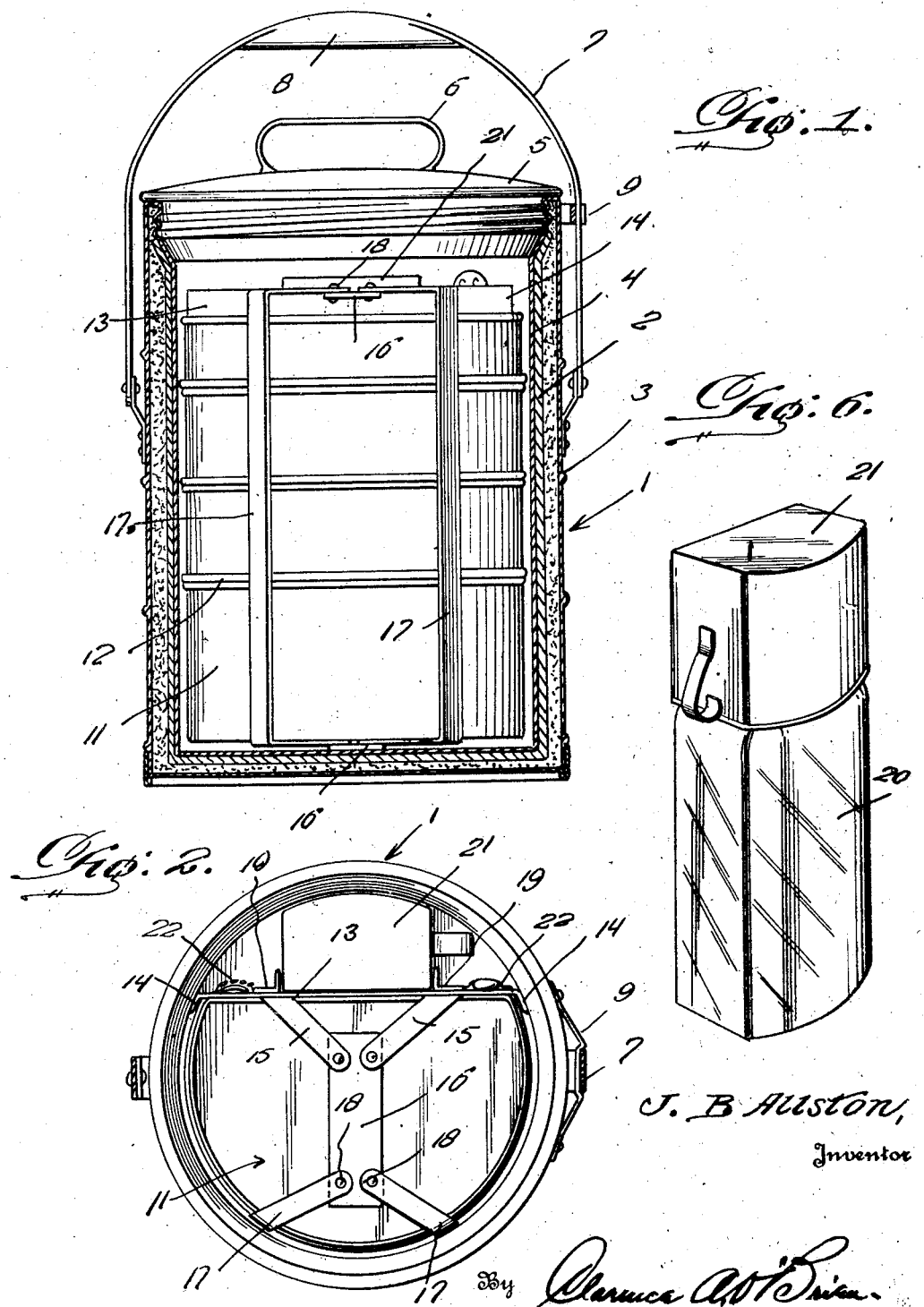

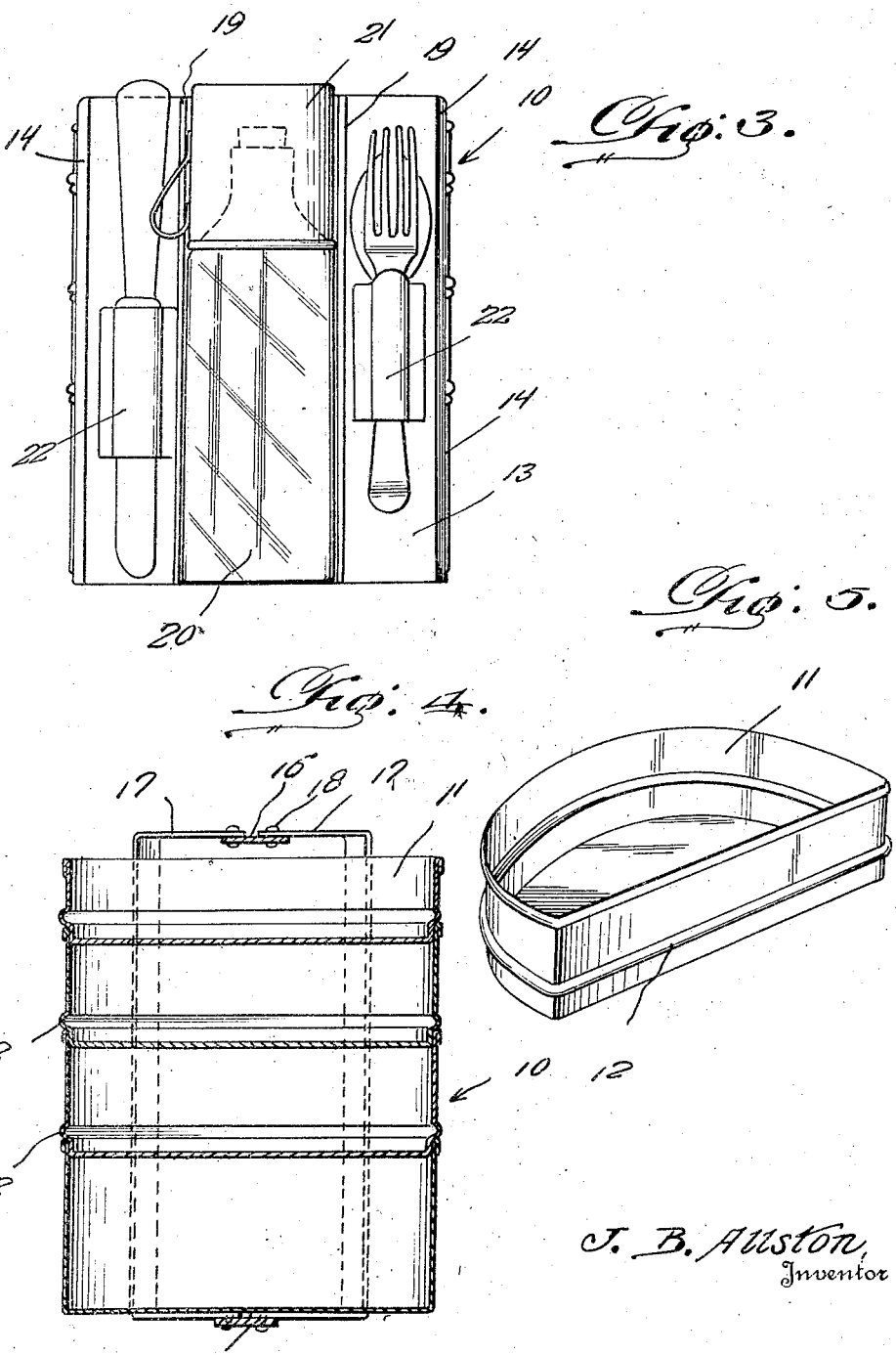

1,573,620

UNITED STATES PATENT OFFICE.

JOSEPH B. ALLSTON, OF GEORGETOWN, SOUTH CAROLINA.

MEAL KIT.

Application filed November 4, 1924. Serial No. 747,821.

*To all whom it may concern:*

Be it known that I, JOSEPH B. ALLSTON, a citizen of the United States, residing at Georgetown, in the county of Georgetown and State of South Carolina, have invented certain new and useful Improvements in Meal Kits, of which the following is a specification.

This invention relates to an improved device, which may be conveniently designated as a meal kit, the same having more particular reference to a meal carrier of this class, which is especially designed for use by workmen, who are compelled to carry their meals from their homes to a place of employment.

The invention has more specific reference to a meal kit of the character specified, wherein the same comprises a container, the wall of which is insulated to maintain the articles of food warm, whereby to permit a hot meal to be had.

The improvement consists in providing a novel sectional food article carrier or receptacle, which is intended to be placed within the aforesaid insulated container, the sections of said receptacle being telescopically fitted into each other to permit one to serve as a cover for the one below it.

Another feature of the invention is the novel device employed for retaining the sections of the food article receptacle in a predetermined relation, this device embodying quick releasable means to permit separation of the sections for removing the articles of food therefrom. The specific details and arrangement of parts, together with the additional advantages derived therefrom will become apparent from the following description and drawing.

In the accompanying drawings, wherein like reference characters serve to designate like parts throughout the same:

Figure 1 is a view, partly in section, and partly in elevation, showing a meal kit constructed in accordance with the present invention.

Figure 2 is a top plan view thereof, with the cover removed.

Figure 3 is an elevational view of the removable unit, composed of the food article receptacle, and retaining means for the parts thereof.

Figure 4 is a central vertical sectional view through the structure seen in Figure 3.

Figure 5 is a detail perspective view of one of the sections or pans of the food article receptacle.

Figure 6 is a detail perspective view of a bottle and a drinking cup, forming a part of the kit.

In carrying out the invention, I employ a pail or container 1, provided with an inner spaced wall or lining 2, between which appropriate insulation material is arranged. In the present instance, I employ a quantity of ground cork 3, and a sheet of asbestos 4. At its top, the pail is screw threaded, to permit a screw cover 5 to be threadedly connected therewith. The container is thus rendered substantially fluid tight. For convenience of removing the cover, it may be equipped with a handle 6, and to also facilitate handling of the improved device, I provide a pivotally mounted bail 7, having a central hand grip 8. If desired, an appropriate keeper may be mounted upon one side of the bail at the top to cooperate with one of the arms of the bail, as seen in Figure 2, to hold it in an upright position.

As before intimated, food carrying means is intended to be removably mounted within the bail. While this means may be of some other construction, it preferably comprises a food article receptacle 10, more clearly shown in Figure 4. This receptacle is made up of a plurality of superposed telescopically engaged segmental pans 11, each being provided, adjacent its bottom, with a surrounding bead 12, resting on the top edge of the cooperating pan.

Although it is not essential, I prefer to construct the various pans of such receptacle of various depths. It is obvious that with the arrangement shown, one receptacle constitutes a cover for the other, permitting fluid foods to be carried in the lower pan.

Improved means is provided for maintaining the pans in the assembled relation shown, and the means employed preferably comprises a backing plate 13 having vertical edge flanges 14, cooperating with the pan, in the manner shown. At the center of its top and bottom, this backing plate is provided with inwardly converging arms 15, which are provided with central plates 16. The inturned ends of a pair of U-shaped retainers 17 are pivoted, as at 18, to the plate 16. These U-shaped retainers are intended to be swung in diverging relation, as shown, to cooperate with the rounded surfaces of the pan, for holding them against displacement. By swinging the members 17 together, however, it is obvious that the pan may be separated, to permit access to be had to the food articles contained therein. On its opposite face, the backing plate 13 is provided with a pair of spaced guide ribs 19, between which a bottle 20 is confined. The bottle is used, as is obvious, to carry tea, coffee, or the like. Fitted over the neck of the bottle, and shaped to conform to and rest upon the shoulders is a removable drinking cup 21. This is of a size to assume the approximate position seen in Figure 3. It is likewise confined between the retaining ribs 19. On opposite sides of the retaining ribs are appropriately shaped pockets 22, for reception of the desired articles of cutlery.

In practice, the articles of food are placed in the desired ones of the pans 11, and the latter assembled in telescopic relation, as seen in Figure 4. The flat sides of the pan are spaced against the inner surface of the backing plate 13. The retaining arms 17 are then swung to the divergent relation shown, to maintain the pans in assembled relation. This unit is then inserted into the pail 1, after which the filled bottle 20 is slid downwardly between the confining ribs 19. The parts then assume the approximate relation seen in Figure 2. After the cover 5 is screwed on, an air tight compartment is provided, and as is well known, the articles of food are maintained substantially in the same condition, as when placed in the container.

It is thought that the foregoing description, when taken in connection with the accompanying drawings will enable persons skilled in the art to which the invention relates to obtain a clear understanding of the same. For this reason, a more lengthy description is thought unnecessary.

While I have shown and described the preferred embodiment of my invention, it is to be understood that minor changes coming within the scope of the invention as claimed, may be resorted to, if desired.

I claim:

In a structure of the class described, a holder for a plurality of superposed pans comprising a backing plate provided with vertical end flanges, and at the center of its top and bottom with inwardly converging arms, a pair of U-shaped retainers, connections between the angular end portions of the retainers and the free end portions of said arms, and a pair of spaced vertical retaining ribs carried by said backing plate.

In testimony whereof I affix my signature.

JOSEPH B. ALLSTON.